(12) United States Patent
Drechsler et al.

(10) Patent No.: US 8,140,179 B2
(45) Date of Patent: Mar. 20, 2012

(54) METHOD AND APPARATUS FOR REPAIRING TURBINE COMPONENTS

(75) Inventors: David E. Drechsler, Clover, SC (US); James N. Cobb, York, SC (US); J. Michael Humber, Charlotte, NC (US)

(73) Assignee: S.E. Huffman Corp., Clover, SC (US)

( * ) Notice: Subject to any disclaimer, the term of this patent is extended or adjusted under 35 U.S.C. 154(b) by 1008 days.

(21) Appl. No.: 12/009,264

(22) Filed: Jan. 17, 2008

(65) Prior Publication Data

US 2008/0173624 A1 Jul. 24, 2008

Related U.S. Application Data

(60) Provisional application No. 60/881,359, filed on Jan. 19, 2007.

(51) Int. Cl.
*B23K 9/12* (2006.01)
*G06F 19/00* (2006.01)
(52) U.S. Cl. ..................... 700/212; 219/125.1
(58) Field of Classification Search .................. 700/212; 219/125.1
See application file for complete search history.

(56) References Cited

U.S. PATENT DOCUMENTS

| | | | |
|---|---|---|---|
| 4,998,005 A | 3/1991 | Rathi et al. | 219/121.83 |
| 7,137,544 B2 * | 11/2006 | Caddell et al. | 228/9 |
| 7,544,112 B1 | 6/2009 | Miller et al. | 451/2 |
| 2006/0067830 A1 | 3/2006 | Guo et al. | 416/229 R |

FOREIGN PATENT DOCUMENTS

WO WO 2005/032755 A2 4/2005

* cited by examiner

*Primary Examiner* — Ryan Jarrett
(74) *Attorney, Agent, or Firm* — K&L Gates LLP

(57) ABSTRACT

The present invention includes an apparatus and method by which the three-dimensional form or configuration of a distorted workpiece, such as a turbine component, is reverse engineered, and then this reverse engineering capability is combined with welding equipment, preferably a laser powder fusion welder, all integrally carried within a single machine, whereby a tool path unique to each workpiece is created and the welding machine accurately replaces lost material on the workpiece. The present invention consists of a series of operations or steps, preferably carried out by a single machine.

8 Claims, 5 Drawing Sheets

METHOD AND APPARATUS FOR REPAIRING TURBINE COMPONENTS

CROSS-REFERENCE TO RELATED APPLICATIONS

This application is entitled to the benefit of, and claims priority to, provisional U.S. Patent Application Ser. No. 60/881,359, filed Jan. 19, 2007, and entitled "METHOD AND APPARATUS FOR REPAIRING TURBINE PARTS," the entirety of which is incorporated herein by reference.

BACKGROUND OF THE PRESENT INVENTION

The present invention relates generally to a method and apparatus for repairing a workpiece, such as turbine components and the like.

As used herein, the term "turbine components" is intended to include individual turbine blades, blades mounted on a disk, blades that are machined integral to a rotor or to an impeller (e.g. Blisks), air foils, vanes and shrouds.

During use, the material at the outer tips, edges or surfaces of turbine components is worn away and damaged, and, in addition, these turbine components tend to become distorted, twisted and bent during use, caused in part by the high temperatures and the temperature variations to which the turbine components are exposed. It is well known that these turbine components can be repaired by welding new materials at the tips, edges or surfaces of the turbine components to replace the material that has been worn away and/or damaged during use by using, for example, a laser powder fusion welding system.

However, because of the aforesaid distortion of the turbine components, the turbine components themselves become twisted and bent, and the uniformity of the turbine components in their original condition is lost. Moreover, because each turbine component is exposed to different operating conditions, the distortion of the turbine components from one turbine component to the next can be significantly different from one another. Accordingly, because of these distortions, and the variations in the distortions, it is difficult to repair turbine components by welding new material at the outer tips, edges or surfaces of the turbine components.

When a distorted turbine component is repaired, any coatings that may be normally applied to the turbine component are removed, and then the turbine component is machined to remove any damaged portions of the turbine component tips, edges or surfaces. Then, conventional welding equipment is used to restore the lost material at the tips, edges or surfaces of the turbine component, and additional steps may be taken to complete the repair process as is well known in the art.

Perhaps the most common welding method for repairing a distorted turbine component, such as a turbine blade, is a manual operation in which a workman manually follows the distorted configuration of the turbine blade by simply holding the welding equipment at a proper location as the welder moves the welding equipment along the outer edge of the distorted turbine blade. The manual operation can be done using MIG, TIG Welding, or plasma arc heat sources. This manual operation is obviously a slow and labor-intensive operation, and in many cases the quality of the weld is poor, and in some cases must be reworked completely.

Additionally, some automated welding systems are used which rely on external measuring methods to probe or digitize a part to determine its configuration, and transfer digital information to a separate welding machine which performs the welding. However, these systems are cumbersome to change part-holding fixtures from one machine to another to retained referenced datum, and they are quite slow in most cases. Accurate data can be lost or changed in translation.

Also, some machines use a system by which video or photographic two-dimensional images are taken within the machine to reverse engineer the turbine component, but these machines are limited to obtaining two-dimensional images at different views, and multiple 2D views can not faithfully reverse engineer some turbine component surfaces which are obviously three-dimensional. These machines generally use either laser powder fusion or plasma methods. Typical illustrations of a machine of this type are disclosed in U.S. Pat. No. 4,998,005 and U.S. Published Patent Application No. 2006/0067830.

SUMMARY OF THE INVENTION

The present invention includes a method for repairing distorted turbine components using a welding machine that is provided with a work table for holding the turbine component, a digitizing device, a welding head, and a computerized control system for controlling the movement of the work table, the digitizing device and the welding head, such method including the steps of (a) operating the welding machine to move the digitizing device relative to the distorted turbine component to digitize the walls of the distorted component and create digitized data that generally represents the geometry of the distorted component; (b) utilizing the digitized data to cause the control system to create a tool path for the welding head to follow so that it moves along the along the actual geometry of the distorted component; (c) programming the welding machine control system to use associated welding parameters; and (d) repairing the distorted component by moving the welding head along the tool path and applying a weld to the distorted component.

In the preferred embodiment of the present invention, the method includes the steps of creating an initial digitizing path that generally represents the geometry of the turbine component in its original configuration; moving a digitizing device along the initial digitizing path to generate digitized data that represents the geometry of the distorted component; utilizing a computer-based template which includes conventional associated weld processing parameters and includes data that conforms to the shape of the component in its original form, and inputting the digitized data into the computer based template to create an updated template; utilizing the updated template to create a tool path for a welding machine to follow along the geometry of the distorted component and to set the associated weld processing parameters; and repairing the distorted component by moving the welding machine along the tool path and applying a weld to the distorted component using the associated weld processing parameters.

It is also preferred that the step of probing the distorted component includes using a touch probe to probe predetermined points along the surface of the distorted component. The turbine component may be a turbine blade which has two radially extending side walls spaced from one another and having an edge portion extending between the side walls, and the probing step may include using the touch probe to probe a plurality of opposite sets of at least two radially spaced points on each of the side walls that define a vector which represents the configuration of the side walls, and the tool path is created along points between the sets of the vectors.

The present invention also includes a machine for repairing turbine components which includes a frame, and a probe mounted on the frame for probing the surfaces of the turbine component and generating electronic signals determined by the configuration of the surfaces of the turbine component. A welding head is also mounted on the frame, and a movable work table is carried by the frame adjacent the probe and the welding head. The work table includes a support on which a turbine component can be mounted, and motion control motors for moving the work table relative to the probe and the welding head about a plurality of axes to selectively vary the position of the turbine component relative to the probe whereby the probe can create a plurality of probe points at predetermined locations on the surface of the turbine component and relative to the welding head whereby the turbine component can be welded by the welding head. The machine is provided with a computerized control system which (a) controls the motion control motors to move the work table relative to the probe to position the turbine component so that predetermined points along the surfaces of the turbine component can be probed at a plurality of predetermined positions and generate the electronic signals at such positions; (b) receives the electronic signals from the probe and creates a tool path that follows the configuration of the turbine component utilizing such signals; (c) controls the motion control motors to move the turbine component relative to the welding head along the tool path; and (d) operates the machine in accordance with a set of predetermined welding parameters to weld the surfaces of the turbine component.

DESCRIPTION OF THE PREFERRED EMBODIMENTS OF THE PRESENT INVENTION

Generally, the present invention includes an apparatus and method by which the three-dimensional form or configuration of a distorted workpiece, such as a turbine component, is reverse engineered, and then this reverse engineering capability is combined with welding equipment, preferably a laser powder fusion welder, all integrally carried within a single machine, whereby a tool path unique to each workpiece is created and the welding machine accurately replaces lost material on the workpiece. The present invention consists of a series of operations or steps, preferably carried out by a single machine, which are described in greater detail below.

Figure 1:
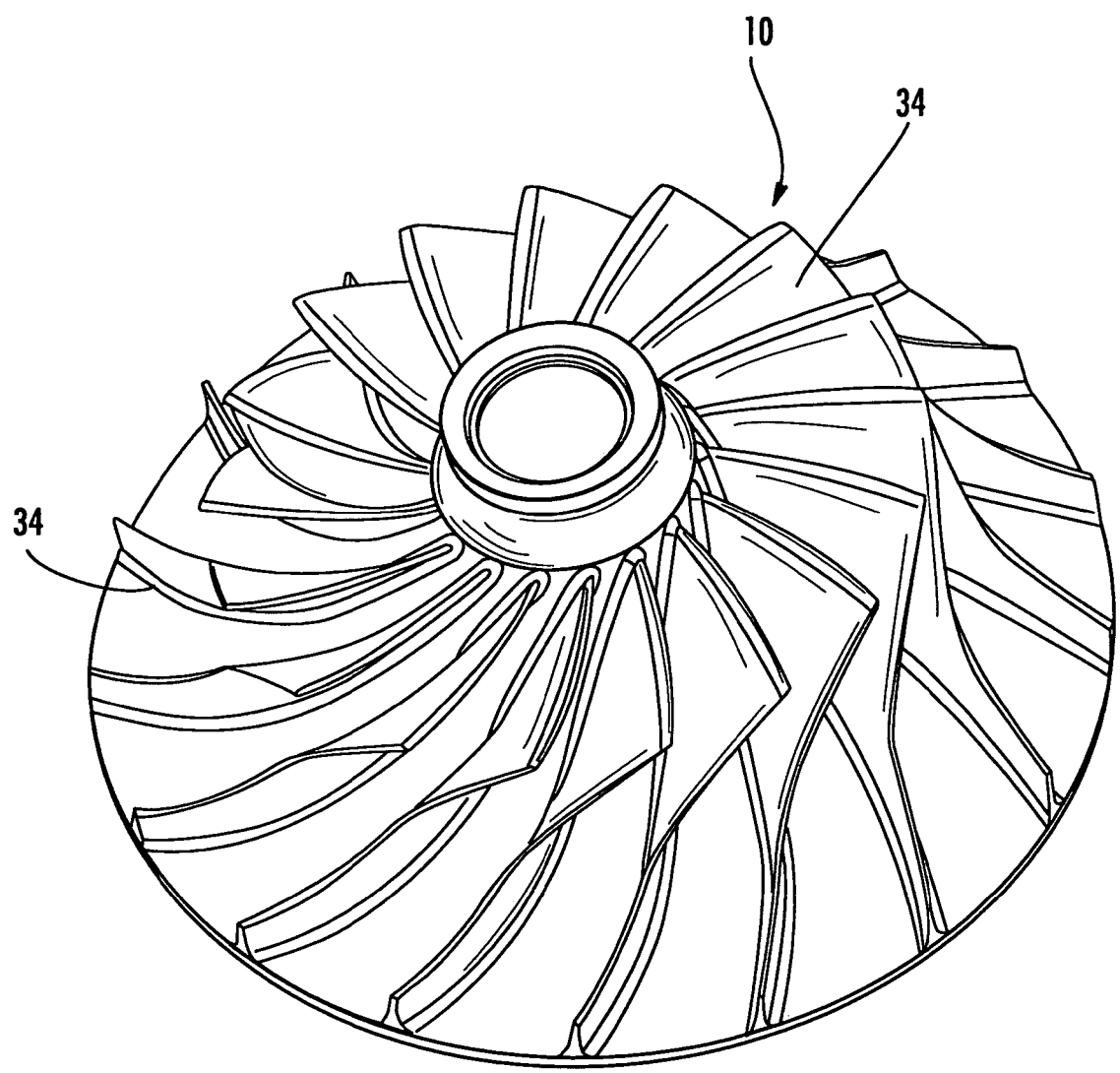
FIG. 1 illustrates a typical impeller with turbine blades in their original state.

FIG. 1 illustrates a turbine wheel or impeller 10, which is a typical turbine component to which the method and apparatus of the present invention is applicable, but it will be understood that the present invention can be used with a variety of other workpieces and turbine components, such as vanes, shrouds, seals and duct segments.

Figure 4:
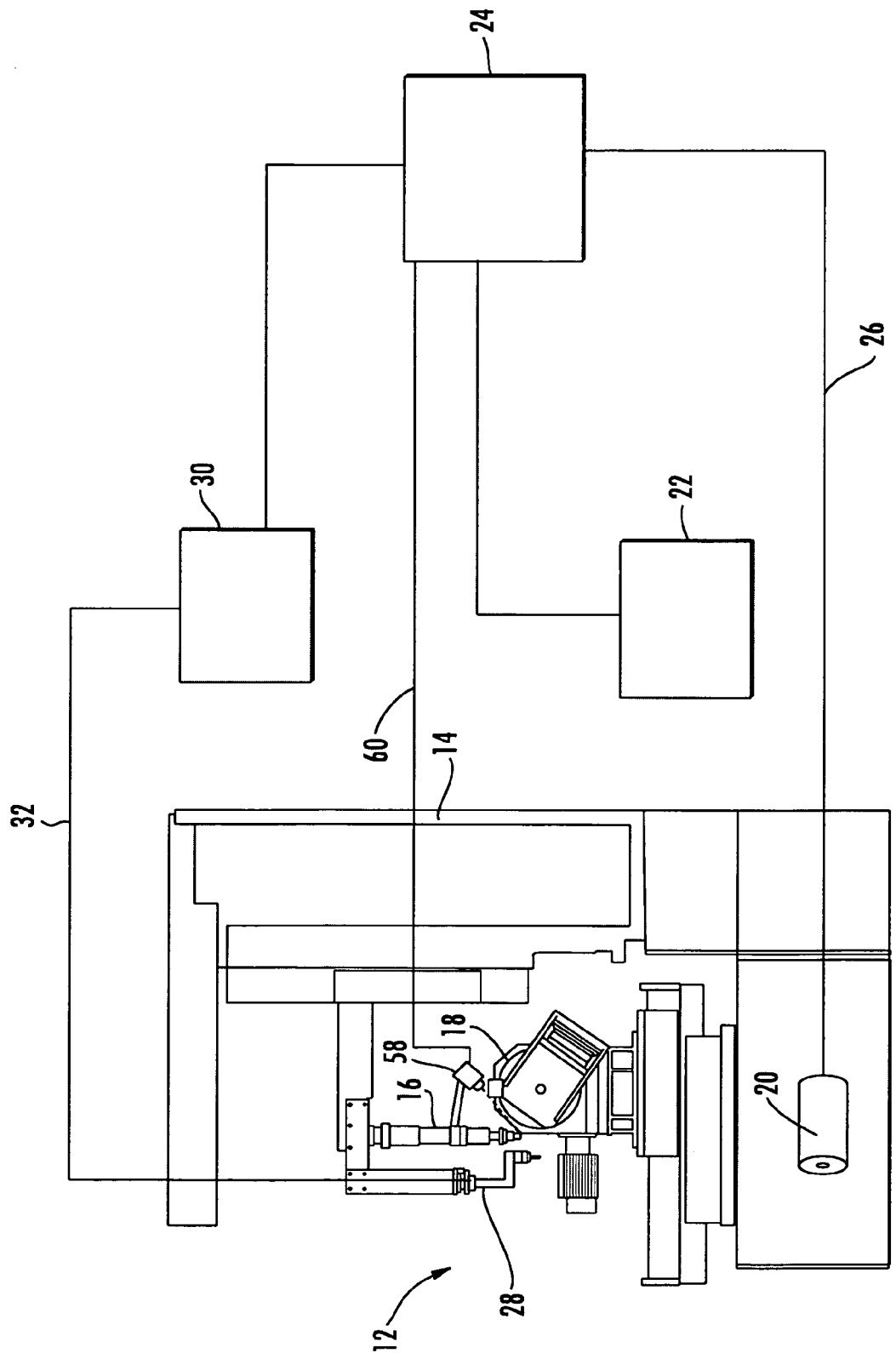
FIGS. 4 and 5 are diagrammatic illustrations of the components of one embodiment of the apparatus of the present invention.
Figure 5:
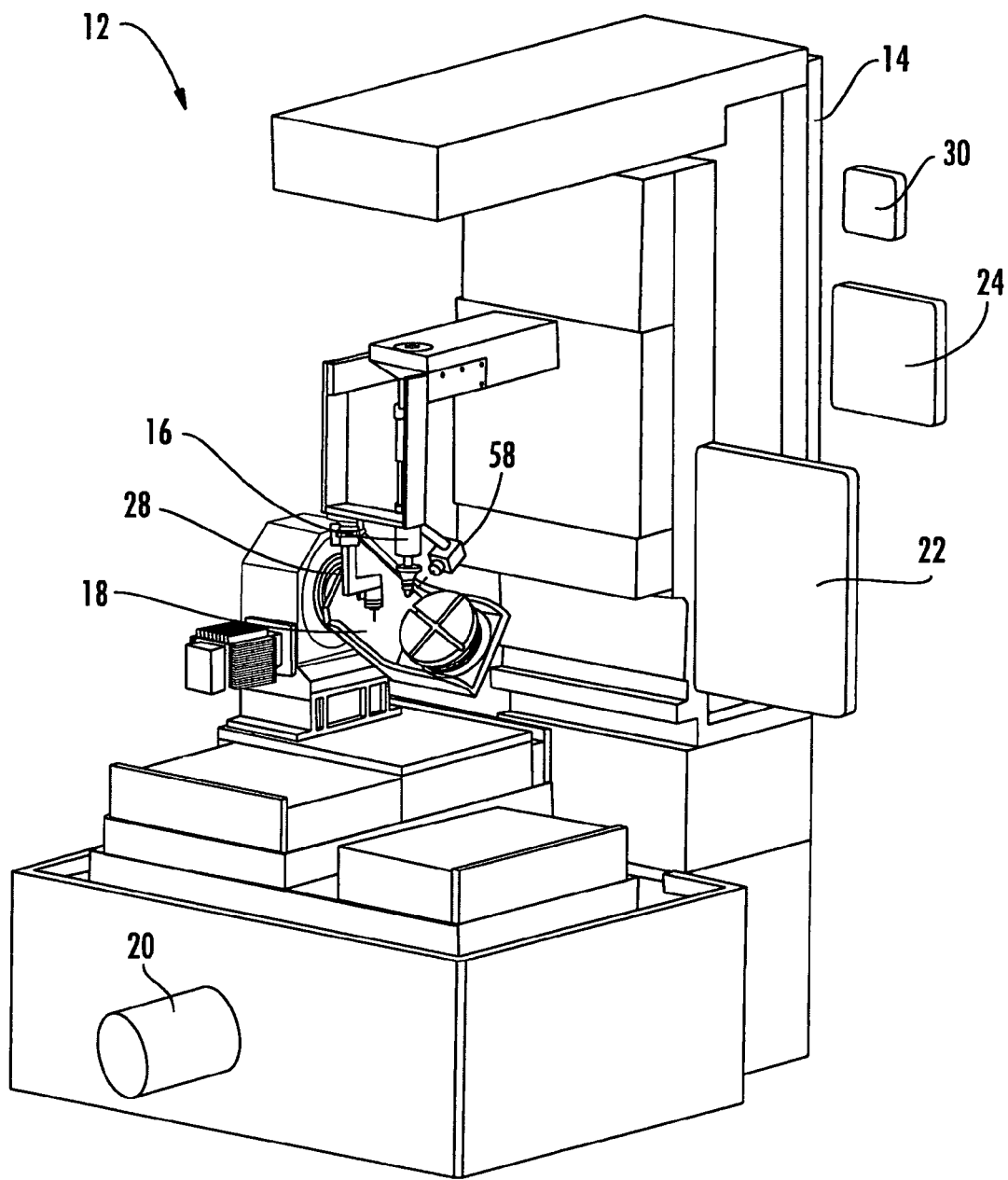

FIGS. 4 and 5 illustrate a conventional welding or cladding apparatus 12 that has been modified in accordance with the present invention. The welding apparatus 12 includes a frame 14 that supports a welding head 16, which preferably includes a laser and powder delivery system for applying a weld to a workpiece such as the turbine impeller 10 (see FIG. 1), and a movable work table 18 that that is moved about a plurality if axes, preferably five, by a plurality of motors 20 (only one of which is shown diagrammatically in FIG. 4) so that the position of the workpiece relative to the welding head 16 can be varied over a wide range during the welding operations, all of which is conventional and well known in the art. The welding apparatus 12 also includes a conventional operator panel or module 22, and a programmable computerized control system 24 which controls the movement of the work table 18 and the operation of the welding head 16 through electrical lines 26 diagrammatically illustrated in FIG. 4.

In accordance with the present invention, this conventional welding apparatus is modified to include a digitizing device 28, and companion electronic hardware 30 that receives signals from the digitizing device 28 and transmits data to the control system 24 through electrical lines 32, all of which is described in greater detail below. The companion hardware 30 can be integrated into the digitizing device 28, or it can be arranged externally of the frame 14.

As best seen in FIG. 1, the impeller 10 has a plurality of radially extending blades 34, and when the turbine wheel 10 is new, the blades 34 extend radially outward in a regular, known pattern, and with a generally uniform radial extent. However, as described in greater detail above, after the impeller 10 has been in use and subjected to high temperatures and temperature variations, the outer ends, tips and/or other surfaces of the blades 34 are worn away, and the blades 34 are distorted significantly so that they no longer follow the uniform pattern of the original impeller 10.

In accordance with the preferred method of the present invention, the first step in repairing the blades 34 of the impeller 10 is to create an initial digitizing path which is based generally on the original geometry or configuration of the impeller 10 and which will include control commands for directing the movement of the welding apparatus 12 relative to the distorted impeller 10 so that it can then digitize the actual distorted configuration of the blades 34. As used herein, digitizing is intended to mean generating digital signals that create a collection of points derived from the turbine component 10 to determine a path of movement which is expressed as machine coordinates. This initial digitizing path provides a path for the welding apparatus 14 to follow that is not exactly the same as the distorted configuration of the part to be repaired, but it is sufficiently close to the distorted configuration to get the digitizing device 28 in the general vicinity of the distorted configuration so that the actual distorted configuration can be sensed. This initial path can be created in a number of different ways, using different sources. By way of example, if the turbine blades 34 of the impeller 10 are the parts to be repaired, an existing CAD model of the impeller's original shape and configuration prior to use is generated. While using the CAD model is generally preferred, the digitizing path can also be created using other sources. For example, a "teaching mode" can be used by which the digitizing device 28, which will be described in greater detail below, is manually jogged along the outer tips, edges, or other surfaces of the distorted turbine blades 34, and the movement of the welding apparatus 12 is programmed so that its path is used to create a series of steps that the welding apparatus 12 can follow in subsequent operations. It is also possible to use a "hard coded" program using manually in-put coordinates that will move the welding apparatus 12 along the original, known path of the blades 34 before they were distorted. In addition to these specific ways of creating a digitizing path, other similar types of equivalent sources could also be used.

A computer-based template is utilized which includes conventional associated weld processing parameters and which is a parametric and mathematical model of the geometry of the impeller 10 and its blades 34 in their original, undistorted configuration, and the generated digitized data is then input into the original template to create and updated template that now includes data derived directly from the shape or configuration of the distorted component. The computer-based template is preferably included within the programmable computerized control system 24.

Next, the turbine component to be repaired is digitized by using the motion of the welding apparatus 12 moving along the initial digitizing path and a feedback system that captures specific point locations on the turbine part itself. In this step, rather than using a two-dimensional image as disclosed in U.S. Pat. No. 4,998,005 and U.S. Published Patent Application No. 2006/0067830, the present invention utilizes a digitizing device 28, which is preferably a touch probe, such as a Model LP2 touch probe manufactured and sold by Renishaw Company, an English company having a sales office in Schaumberg, Ill. However, it will be understood that other known digitizing devices can be used, depending on the particular application of the present invention, including scanning probes, x-rays, eddy current probes, laser probes and scanners, structured light scanners, photogrammetry and the like.

Figure 2:
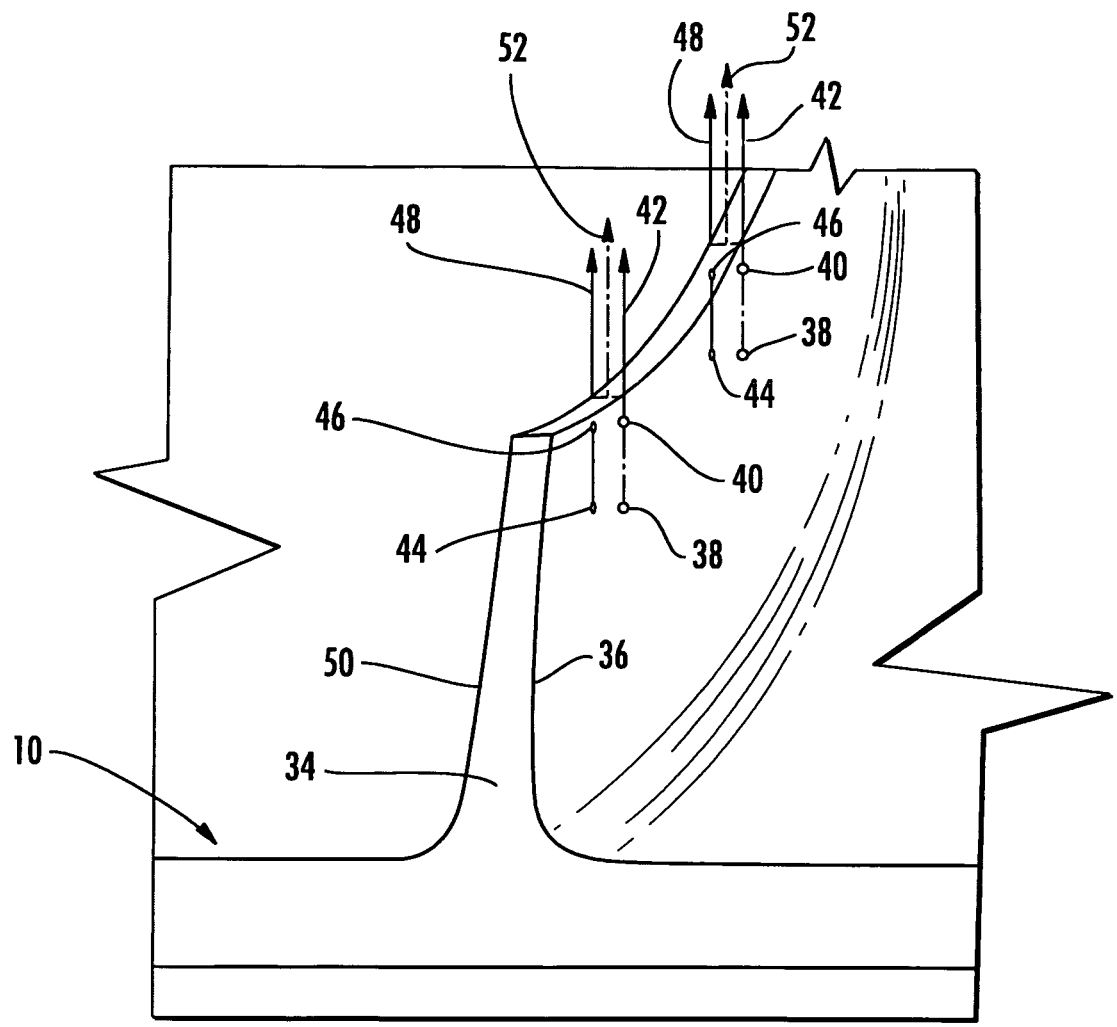
FIG. 2 is a diagrammatic view taken through a turbine blade to be repaired, and illustrating data obtained in accordance with the present invention.
Figure 3:
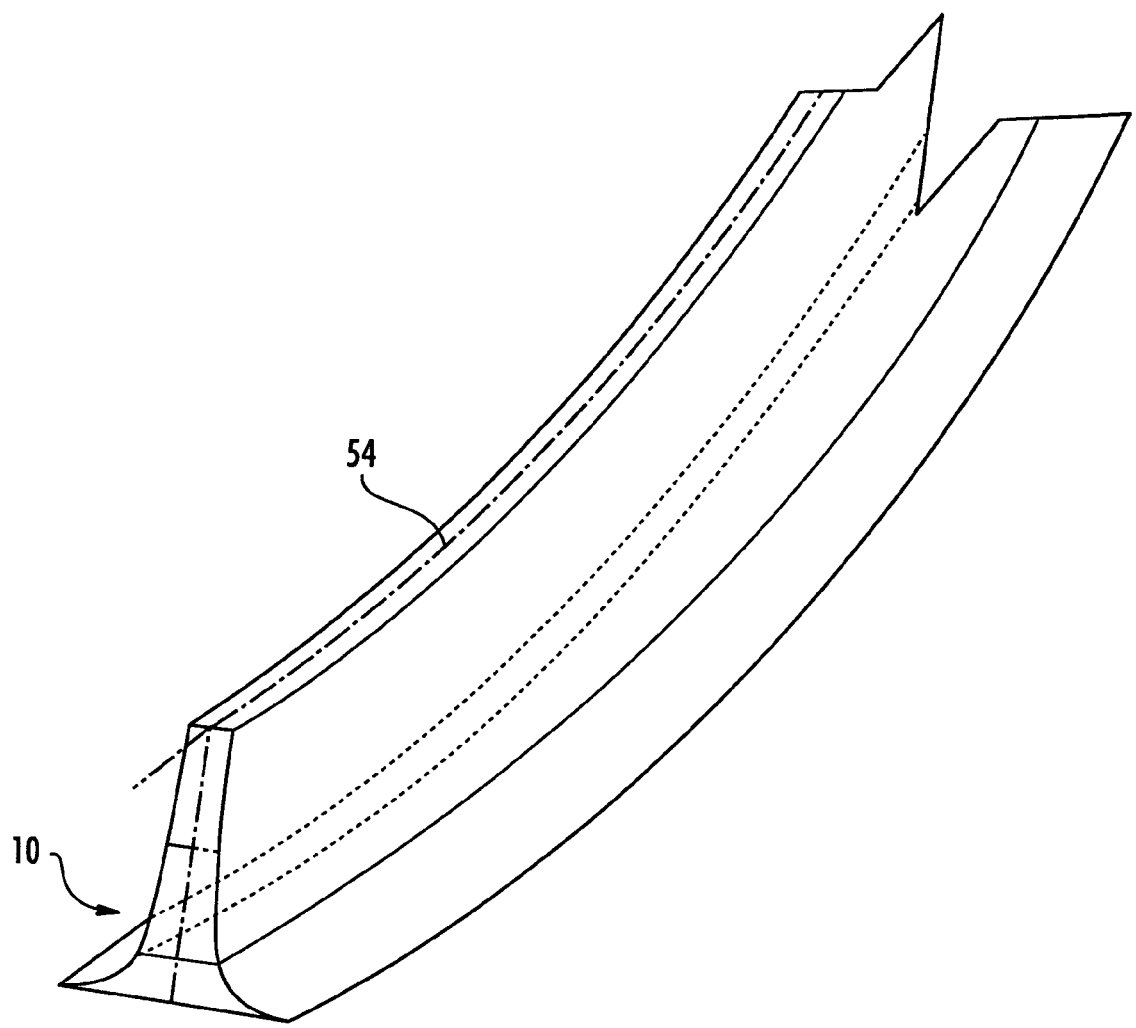
FIG. 3 illustrates a turbine blade with the mid-spline of the outer edge of the turbine blade identified.

The digitizing step is best illustrated in FIG. 2. As the welding apparatus 12 moves relative to the impeller 10 along the initial digitized path as described above, the digitizing device 28 probes the exterior surface of one of the side walls 36 of a blade 34 to find its location and establishes a lower point 38 and an upper point 40 radially above the lower point 38. The companion hardware 30 translates these two points 38, 40 into a vector 42 passing through the two points 38, 40, and this vector 42 represents the radial extent or configuration of the surface of the side wall 36. Similarly, the digitizing device establishes a second lower point 44, a second upper point 46, and a vector 48 that represents the radial extent or configuration of the surface of the opposite wall 50 of the blade 34. The companion software 30 then determines a base vector 52 which is midway between the first and second vectors 42 and 48 as illustrated in FIG. 2. This process is repeated at a large number of locations along the blade 34, only two of which are illustrated in FIG. 2. After the plurality of base vectors 52 have been created, they are used by the companion software 30 to create a tool path 54 that passes through the base vectors 52 along the centerline of the distorted blade 34 as best illustrated in FIG. 3. This tool path 54 is in the form of a set of instructions that can be transmitted to the control system 24 and used to move the welding apparatus 12 in a way that the relative movement of the welding head 16 follows the actual path of the distorted and bent turbine blade 34 during the welding operation. While the particular digitizing step illustrated in FIGS. 2 and 3 and described above is illustrative of one application of the present invention for repairing the blades of turbine impeller, it will be understood that the digitizing step can be carried out on a wide variety of turbine components and other work pieces as described above that have a variety of surface configurations, including, for example, flat surfaces, arcuate surfaces, and curved surfaces, and whereas two probe points 38 and 39 are used to form the vector 42 in FIGS. 2 and 3, it will be understood that the number of probe points used to establish the desired vectors in any particular application may be more than just two, depending on the configuration of the surface being probed.

In the preferred embodiment of the present invention, the initial computer-based template which has been created using the initial digitizing path as described above, is combined with the data obtained from the digitized points (e.g. points 38, 40, 44, 46) to create a tool path 54 and to set the previously established conventional associated process parameters, such as laser parameters, traverse speeds of the weld head 16, powder flow rates, and the like. Thus, in this preferred embodiment of the present invention, the template created using the CAD model or other means described above establishes a coarse initial digitizing path based on the original configuration of the impeller 10, and this coarse tool path is then fine-tuned using the digitized points to create a much more accurate tool path 54 that is based on the actual geometry or configuration of the distorted turbine blade 34 itself.

The template which is included in the control system 24 of the welding apparatus 12 is programmed in a conventional manner to set the various parameters normally associated with the welding operation, such as laser power settings, powder flow rate, feed rates, etc. These parameters are generally set manually, and they are usually based on historical knowledge and empirical test from other welding operations, and it will be understood that these parameters will vary, sometimes significantly, depending on the particular welding application of the present invention. Additionally, in some cases the weld parameters will be altered in the updated template based on the actual geometry of the part that is being welded, as determined by the digitizing method described above, and these weld parameters are then set to include any alterations that may be indicated by the digitized data obtained by the present invention as described above. Once the correct parameters have been set for the welding apparatus 12, and the actual tool path 54 corresponding to the tool part itself has been determined as described above, the welding apparatus 12 and the welding head 16 move relative to the work table 18 and the turbine component 10 mounted therein along the desired tool path 54 and a weld is applied to the part at the desired points (e.g. along the outer edge of an impeller blade 34) using standard welding procedures.

The welding apparatus 12 may, if desired, be modified to provide feedback information relating to the quality of the weld to the control system 24 during the welding operation to improve the welding operation by using an information gathering feedback device 58, which is illustrated in FIGS. 4 and 5. The feedback device 58 is positioned near the welding head 16 so that it can be directed toward the weld as is being formed on the turbine component 10 and gather information relating to various characteristics of the weld, and then transmit such information back to the control system 24 through electrical line 60. The control system 24 is programmed to receive this feedback information and compare it with a predetermined welding model. If there is a variance from the predetermined welding model, the control system 24 may modify one or more of the associated welding parameters to correct the variance. For example, the feedback device 58 may be an x-ray device that is used to measure the porosity of the weld as it is being made, and this information if fed back to the control system 24 and used to modify the operation of the welding machine, if necessary, to correct any undesirable variations of the porosity of weld. Similarly, the feedback device may be an infrared camera that can be used to feed back information to the control system 24 relating to the temperature or size of the weld. Other sensors for other characteristics of the weld may also be used.

Thus, based on the above, it will be apparent that the present invention uniquely combines a system for digitizing a machine part and utilizing a three-dimensional digitization process to create a tool path that accurately reflects the actual geometry of a part to be repaired, even though it may be distorted, twisted and bent. This accurate tool path is then utilized to direct the movement of a welding machine along the desired geometry, and in the preferred embodiment of the present invention, the digitization system and the welding components are combined into a single apparatus 12 as illustrated diagrammatically in FIG. 4, which results in a fast, accurate and efficient system for welding a workpiece, such as a turbine impeller 10.

In view of the aforesaid written description of the present invention, it will be readily understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

What is claimed is:

1. A method for repairing distorted turbine components, which includes:
    (a) creating an initial digitizing path that generally represents the geometry of the component in its original configuration;
    (b) moving a digitizing device along the initial digitizing path to generate digitized data that represents the geometry of the distorted component;
    (c) utilizing a computer-based template which includes information that conforms to the shape of the component in its original form and which includes associated weld processing parameters, and inputting the digitized data into the computer-based template to create an updated template;
    (d) utilizing the updated template to create a tool path for a welding machine to follow along the geometry of the distorted component and to set the associated weld processing parameters; and
    (e) repairing the distorted component by moving the welding machine along the tool path and applying a weld to the distorted component using the associated weld processing parameters.

2. A method for repairing turbine components as defined in claim 1, wherein the step of digitizing the distorted component includes using a digitizing device to digitize predetermined points along the surface of the distorted component, and wherein the predetermined digitized points are utilized to create the tool path.

3. A method for repairing turbine components as defined in claim 1, wherein the digitizing device digitizes at least two predetermined digitized points along the surface of the distorted component.

4. A method for repairing turbine components as defined in claim 3, wherein the distorted turbine component includes two radially extending side walls spaced from one another and having an edge portion extending between the spaced walls, and wherein the digitizing device probes a plurality of sets of at least two radially spaced points on each of the side walls that define a vector which represents the configuration of the side walls, and wherein the tool path is created along points between the sets of vectors.

5. A method for repairing turbine components as defined in claim 1, wherein the digitizing device is a touch probe.

6. A method for repairing turbine components as defined in claim 1, wherein the step of creating an initial digitizing path includes using a CAD model of the geometry of the component in its original configuration.

7. A method for repairing turbine components as defined in claim 1, wherein the step of creating an initial digitizing path includes creating a hard coded program using manually input welding machine coordinates that reflect the geometry of the component in its original configuration.

8. A method for repairing turbine components as defined in claim 1, wherein the method includes the steps of gathering feedback information relating to one or more characteristics of the weld as it is being formed on the turbine component, comparing the feedback information to a predetermined welding model, and varying the associated welding parameters to correct variances between the feedback information and the predetermined welding model.

* * * * *